(12) United States Patent
Chung et al.

(10) Patent No.: US 11,016,861 B2
(45) Date of Patent: May 25, 2021

(54) CRASH RECOVERABILITY FOR GRAPHICS PROCESSING UNITS (GPU) IN A COMPUTING ENVIRONMENT

(71) Applicant: INTERNATIONAL BUSINESS MACHINES CORPORATION, Armonk, NY (US)

(72) Inventors: I-Hsin Chung, Westchester, NY (US); Zaid Qureshi, Bronx, NY (US); Jinjun Xiong, Goldens Bridge, NY (US); Hubertus Franke, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 16/381,959

(22) Filed: Apr. 11, 2019

(65) Prior Publication Data
US 2020/0327019 A1 Oct. 15, 2020

(51) Int. Cl.
*G06F 11/14* (2006.01)
*G06T 1/20* (2006.01)
*G06F 13/28* (2006.01)

(52) U.S. Cl.
CPC .......... *G06F 11/1471* (2013.01); *G06F 13/28* (2013.01); *G06T 1/20* (2013.01); *G06F 2201/84* (2013.01)

(58) Field of Classification Search
CPC ............. G06F 11/1407; G06F 11/1402; G06F 11/1415; G06F 11/1471
See application file for complete search history.

(56) References Cited

U.S. PATENT DOCUMENTS

| 6,418,460 | B1* | 7/2002 | Bitar ...................... G06F 9/462 712/233 |
| 6,795,966 | B1 | 9/2004 | Lim et al. |
| 9,201,187 | B2 | 12/2015 | Shikii et al. |
| 10,019,327 | B1* | 7/2018 | Backensto .......... G06F 11/1448 |
| 10,275,851 | B1* | 4/2019 | Zhao ..................... G06F 9/5044 |
| 2005/0050307 | A1 | 3/2005 | Reinhardt et al. |
| 2008/0288558 | A1 | 11/2008 | De Pauw et al. |
| 2011/0167196 | A1 | 7/2011 | Scales et al. |
| 2013/0185716 | A1 | 7/2013 | Yin et al. |
| 2013/0290781 | A1 | 10/2013 | Chen et al. |

(Continued)

FOREIGN PATENT DOCUMENTS

WO 2018053051 A1 3/2018

OTHER PUBLICATIONS

Yulu Zhang et al., "A Checkpoint/Restart Scheme for CUDA Applications with Complex Memory Hierarchy," 2013 14th ACIS International Conference on Software Engineering, Artificial Intelligence, Networking and Parallel/Distributed Computing, Honolulu, HI, 2013, pp. 247-252, doi: 10.1109/SNPD.2013.5.*

*Primary Examiner* — Matthew M Kim
*Assistant Examiner* — Kurosu Risa Altaf
(74) *Attorney, Agent, or Firm* — Griffiths & Seaton PLLC

(57) ABSTRACT

Embodiments for crash recoverability for graphics processing units (GPUs) by a processor. GPU application data and kernel execution state of one or more GPUs may be checkpointed. The checkpointed GPU application data and the kernel execution state may be recovered. The checkpointed GPU application data and the kernel execution state may be persisted on non-volatile memory.

20 Claims, 9 Drawing Sheets

(56) References Cited

U.S. PATENT DOCUMENTS

2014/0267328 A1    9/2014  Banack et al.
2017/0293510 A1*  10/2017  Memon ............... G06F 11/0751
2019/0339955 A1*  11/2019  Kuo ....................... G06F 9/485

* cited by examiner

CRASH RECOVERABILITY FOR GRAPHICS PROCESSING UNITS (GPU) IN A COMPUTING ENVIRONMENT

BACKGROUND OF THE INVENTION

Field of the Invention

The present invention relates in general to computing systems, and more particularly to, various embodiments for crash recoverability for graphics processing units (GPUs) in a computing environment.

Description of the Related Art

A popular type of large-scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

SUMMARY OF THE INVENTION

Various embodiments for crash recoverability for graphics processing units (GPUs) in a computing environment are provided. In one embodiment, by way of example only, a method for guaranteeing/ensuring crash recoverability for graphics processing units (GPUs) in a computing environment, again by a processor, is provided. GPU application data and kernel execution state of one or more GPUs may be checkpointed. The checkpointed GPU application data and the kernel execution state may be recovered. The checkpointed GPU application data and the kernel execution state may be persisted on non-volatile memory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
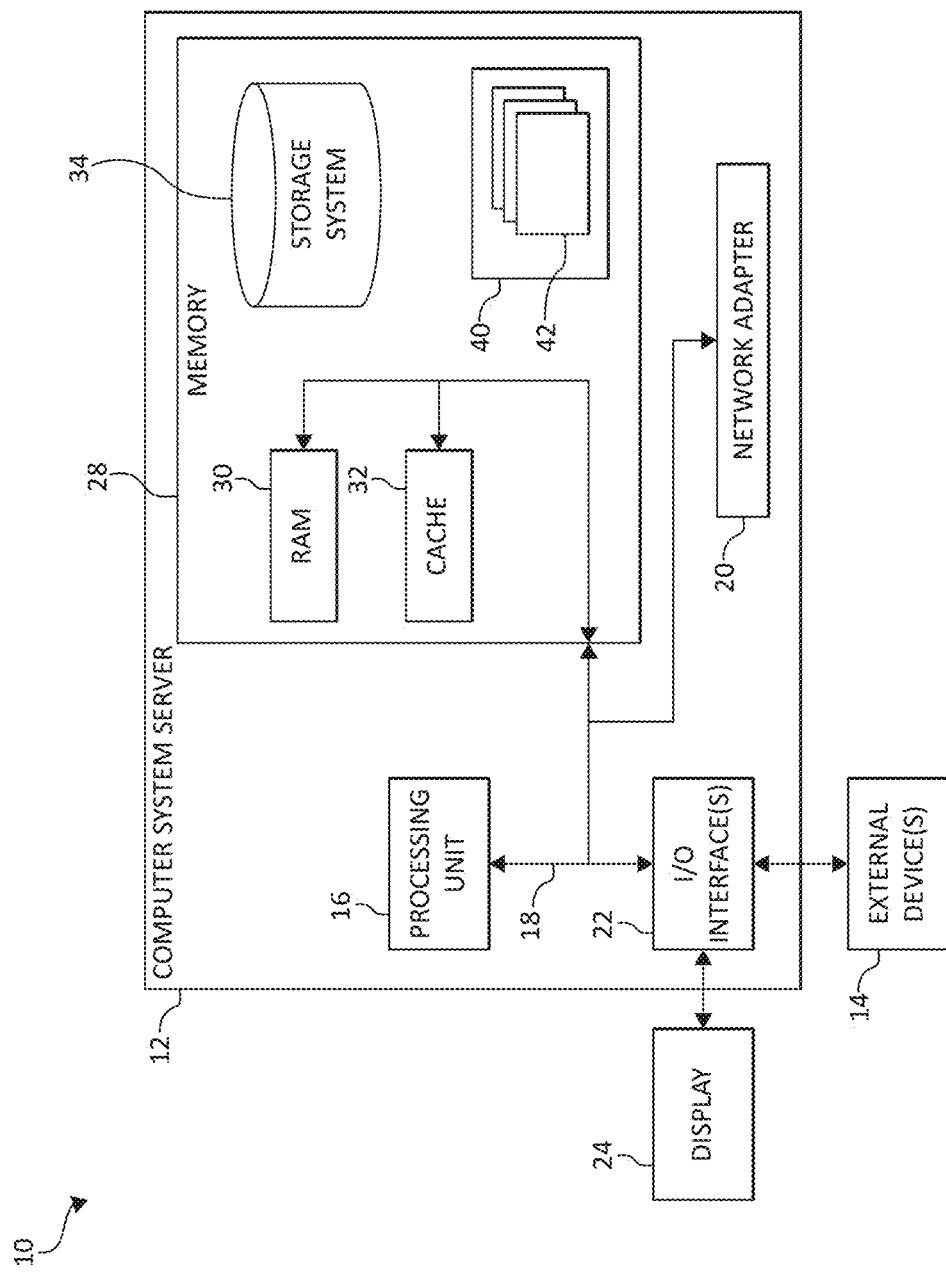
FIG. 1 is a block diagram depicting an exemplary computing node according to an embodiment of the present invention.

Currently, many computer systems employ accelerators (e.g., co-processors such as Graphical Processing Units (GPUs)) to enhance the performing of such system, where programs run on both central processing units ("CPU") and the accelerators. For example, GPU's may engage in performing complex mathematical calculations. Also, the parallel structure of GPUs enables them to be more effective than CPUs for applications/operations that may process large blocks of data. However, computing systems may "crash" with irritating frequency resulting in lost data/information and may require extensive computing resources for system recovery.

As such, computing system recovery has become increasingly important in the information technology industry. Facilitating the transfer of important data during a failure of such devices (i.e., CPUs and GPUs) is imperative and can be done via a server transfer, through applications, or other means.

Moreover, periodically, a database server flushes transactions and data within the buffer pool to disk. Until the transactions and data are flushed to disk, the data and transactions are in a state of flux. Instead of forcing every transaction to disk immediately after a transaction is completed, the database server writes transactions to a logical log. The database server logs the transactions as they occur. In the event of a system failure, the computing system may replay the log to redo and restore the transactions and returns the database to a state consistent with the state of the database system at the time of the failure.

To facilitate the restoration or logical recovery of a database system, the database server generates a consistency point, called a checkpoint. A checkpoint is a point in time in the log when a known and consistent state for the database system is established. Typically, a checkpoint involves recording a certain amount of information so that, if a failure occurs, the database server can restart at that established point. The purpose of a checkpoint is to periodically move the restart point forward in the logical log. If checkpoints did not exist and a failure occurred, the database server would be required to process all the transactions that were recorded in the logical log since the system restarted. Thus, "checkpointing" may be defined as a sequence of instructions in a computer program that allows recording and identification of various errors that occur during startup. Checkpointing may entail capturing an application's running state and memory footprint and saving it (e.g., the running state and/or memory footprint) to non-volatile memory, such as disk or tape, so that the running state and/or memory footprint can be recovered later using an operation known as a "restart."

Additionally, multiple compute nodes each with multiple GPUs in datacenters and supercomputers may be used in a computing system. As such, given the vast amount of computing components, it is inevitable that a "crash" or failure occur either at the hardware or software level (e.g., hardware/software failure, bugs, GPU unplugged/hot plugged, driver/OS crash, bit flips, power failure, etc.). Given the fact that GPU processes can be long running with a high probability of a system crash or failure, crash recovery for GPU applications are critical for datacenters GPUs and should be able to checkpoint and recover with low overhead. Currently, however, computing systems only checkpoint and restore a state of the CPU and its memory. Current computing systems do not provide for checkpointing and recovering the state of applications using GPUs in a computing system, which includes application data and kernel execution state on the GPUs. Accordingly, the present invention provides for an application programming interface ("API") and a computing system for synchronizing an application kernel execution on multiple GPUs, synchronizing GPU execution, obtaining state of the kernel and application data to create a checkpoint, persisting a checkpoint to non-volatile storage like SSD efficiently, and/or recovering GPU application execution from the checkpoint.

In one aspect, the present invention provides for crash recoverability for one or more GPUs in a computing environment are provided. In one embodiment, by way of example only, mechanisms of the illustrated embodiments provide for guaranteeing/ensuring crash recoverability for GPUs in a computing environment by: 1) checkpointing GPU application data and kernel execution state of one or more GPUs; 2) recovering the checkpointed GPU application data and the kernel execution state; and 3) persisting the checkpointed GPU application data and the kernel execution state on non-volatile memory.

In this way, multiple GPUs and multiple compute node checkpointing and recovery can be implemented by synchronizing the CPUs and GPUs, providing persistent checkpoints, and leveraging bandwidth between non-volatile memory and a GPU for checkpointing and recovery. Also, the present invention enables application kernels to no longer require modifications, but any modification may be inserted by a compiler. The present invention also provides for debugging a GPU execution and allow for execution migration.

In an additional aspect, the present invention provides for checkpointing GPU application data and GPU kernel execution state. In step 1), GPU application data structures are registered using a provided "register_data_structure" API call. Registered data structures may have their contents checkpointed when checkpoint is created. In step 2), a GPU kernel execution state may be represented by a bit vector in GPU global memory where each bit represents whether the corresponding thread block has or has not finished execution (e.g., finished execution using a "1" bit or an unfinished execution using a "0" bit). When a GPU thread block finishes its normal execution the GPU thread block may update the bit in the bit vector corresponding to its block identifier ("ID") with a 1.

In step 3), a CPU may signal one or more GPU(s) by writing a value to a unified memory location using a provided "create_checkpoint" API call. An application may issue this API call manually or set a frequency of checkpointing using a provided "set_checkpointing_frequency" API call where a dedicated CPU thread checkpoints using the create_checkpoint API at selected time periods based on the set frequency. GPU thread blocks executing on the GPU may check the value of this unified memory location at the end of their regular execution.

In step 4), a first thread block that identifies that the CPU intends/wants to checkpoint (e.g., the first thread block is known/identified/labeled as a master block), initiates a barrier between all currently executing blocks (e.g., slave blocks) using a semaphore in GPU global memory. When a slave block is finished with its regular execution, the slave block updates the semaphore and waits for a second signal from the master block.

In step 5), after each slave block has reached a barrier (e.g., a semaphore value is 0), the master block copies the registered data structures to pre-allocated location in GPU memory. The master block may copy the execution bit vector (from step 2) to a pre-allocated location in GPU memory. In step 6), the master block may signal the slave blocks to continue by writing to a location in GPU global memory. In step 7), the master block signals the CPU that checkpoint has been created in CPU giving it pointer to checkpoint data in GPU memory. In step 8), the CPU initiates direct memory access ("DMA") between the GPU memory and non-volatile memory (e.g., a solid-state drive "SSD") so that the checkpointed data structures (in step 5) and execution state bit vector (in step 5) are persisted to a file on the non-volatile memory.

In step 9), a separate log file may be appended to the non-volatile memory to specify that a new checkpoint is created together with the offset in the checkpoint file pointing to the newly created checkpoint. In step 10), this process can repeat from step 3 for creating multiple checkpoints.

In addition, the present invention provides for checkpointing using multiple GPUs. In step 1), the operations described above in steps 1-4 for checkpointing GPU application data and GPU kernel execution state may be first be performed. In step 2) after each slave block in each GPU has reached the local barrier (step 5 above), the GPUs may synchronize with each other using a semaphore in unified memory if the GPUs are in one node. If the GPUs are distributed across multiple nodes, after each slave block in each GPU has reached the local barrier (step 5 above), the CPUs managing the GPUs must synchronize with a distributed barrier. In step 3), registered data structures may be copied to pre-allocated memory locations. If data structure is shared among all GPUs (e.g., in unified memory), then a master block of GPU 0 makes the copy. Otherwise, if a registered data structure is local to a GPU the master block of that GPU makes the copy.

In step 4), each GPU's master block makes a copy of the execution state bit vector. In step 5), each GPU's master block tells the CPU that it finished with the copies and releases the slave blocks. In step 6) a CPU initiates DMA between SSD and GPU to persist application data and execution state where each GPU has a separate file on the non-volatile memory (e.g., SSD) to avoid corruption of checkpoint. On recovery, each GPU's file is used to recover its state.

In the case that the multiple GPUs are located across multiple host systems, the host system must coordinate the checkpoint. In that case, the multiple host systems participate in a barrier (e.g., a distributed barrier as compared to a local barrier) and when all host systems have reached the distributed barrier each host system will proceed with the steps outlined above to ensure the checkpoint is consistent.

In an additional aspect, the present invention provides for recovering checkpointed GPU application data and kernel execution state. In step 1), a "restore_checkpoint API" call may be provided and used when application starts to restore GPU application data and kernel execution state. In step 2), a log file may be scanned to find the latest complete checkpoint and the file offset in the checkpoint file for the latest checkpoint. Any incomplete checkpoint data in the file is discarded. In step 3), from the most recent/latest checkpoint, data for registered data structures may be copied the checkpoint file on non-volatile memory (e.g., SSD) to pre-allocated GPU memory using DMA between the non-volatile memory (e.g., SSD) and GPU.

In step 4), from the latest checkpoint, a bit vector for the kernel execution state may be copied from the checkpoint file on non-volatile memory (e.g., SSD) to a pre-allocated GPU memory using DMA between SSD and GPU. In step 5), an application starts a kernel using restored application data and a kernel execution state bit vector. In step 6) when a thread block executes, the thread block checks the bit in the bit vector corresponding to its block ID. If the bit is set as 0, for example, the "0" bit indicates the block has not been previously executed and needs to continue its normal execution. If the bit is set as "1," the "1" bit indicates the block has previously executed prior to the checkpoint and does not need to execute again and return.

It should be noted, as used herein, the present invention provides for use of one or more types of API calls. For example, an "register_data_structure (TYPE t, int size, void* addr)" API call may register an application specific GPU data structure (e.g., array) for checkpointing comprised of an array in memory such as, for example, point to by <addr> of length <size> and a type <TYPE> and adds the information to a global vector for when checkpoints are created so that GPU arrays can be checkpointed. The type <TYPE> maybe one of a set of well-known system types such as float, integer, character ("char").

A "set_checkpointing_frequency(int freq)" API call may be used to set a frequency of checkpointing. For example, the frequency of checkpointing may be the frequency—a number between [0,9] to specify how often to automatically checkpoint, with 0 being never (e.g., do not automatically checkpoint) and 9 being very frequently (e.g., automatically checkpoint at one or more time periods). A default frequency may be set as 0.

A "create_checkpoint(char filename[])" API call may be an explicit call to create checkpoint such as, for example, by 1) a CPU signals GPU(s) to synchronize all executing blocks using a variable in unified memory, and 2) starts checkpointing routine.

A "restore_checkpoint(char filename[])" API call may restore a most recent checkpointed data structures and kernel bit vectors from a file to GPU memory using DMA between non-volatile memory and a GPU.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
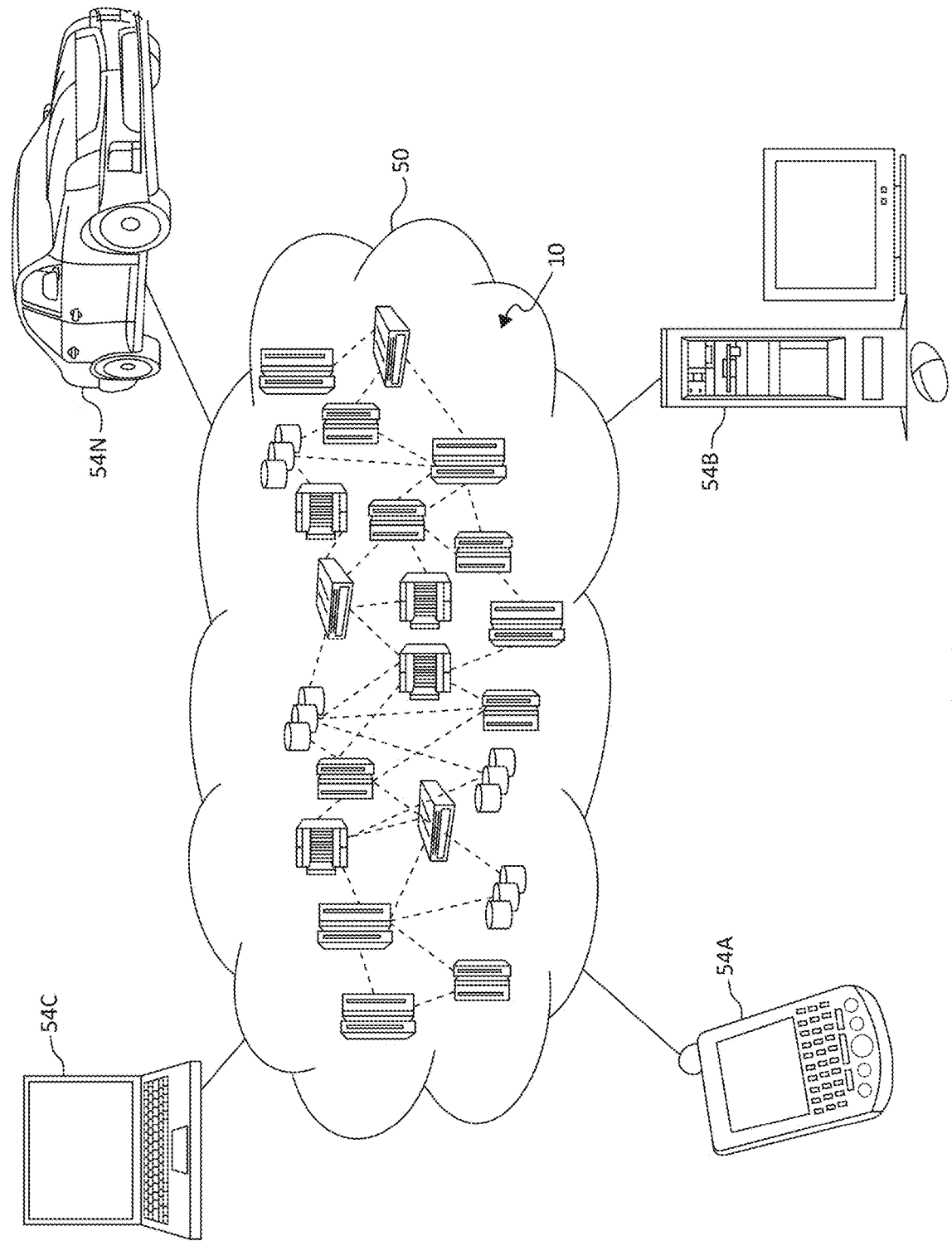
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, an intelligent ("smart") mattress 54D, and/or automobile computer system 54N may communicate. As used herein, a mattress such as, for example mattress 5D may be a pad, mat, cushion, foam, or object designed for supporting or reclining all or portions of a body such as, for example, a bed (or part of a bed), couch, sofa, recliner, seat, chair, or seat.

Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
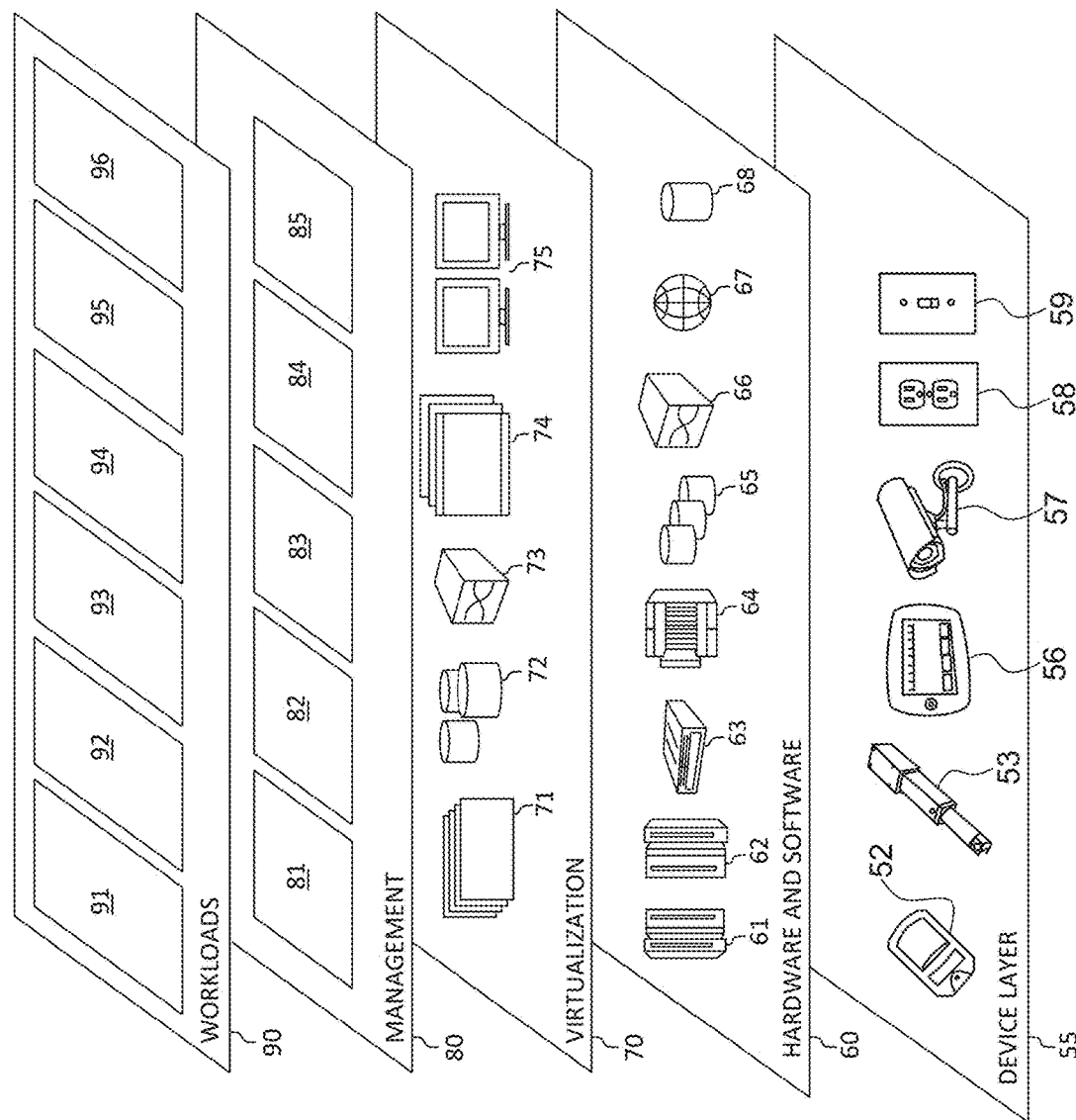
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various GPU crash recovery workloads and functions 96. In addition, configuring settings for various GPU crash recovery workloads and functions 96 may include such operations as data analysis (including data collection and processing from various environmental sensors), networking, sending/receiving data, providing virtualization/virtual compute, checkpointing, recovery, cloud computing communications, and/or management functions. One of ordinary skill in the art will appreciate that the configuring settings for various computer-controlled devices using workloads and functions 96 for GPU crash recovery may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously stated, the mechanisms of the present invention provide a novel approach for crash recoverability for one or more GPUs in a computing environment are provided. GPU application data and kernel execution state of one or more GPUs may be checkpointed. The checkpointed GPU application data and the kernel execution state may be recovered. The checkpointed GPU application data and the kernel execution state may be persisted on non-volatile memory.

Figure 4:
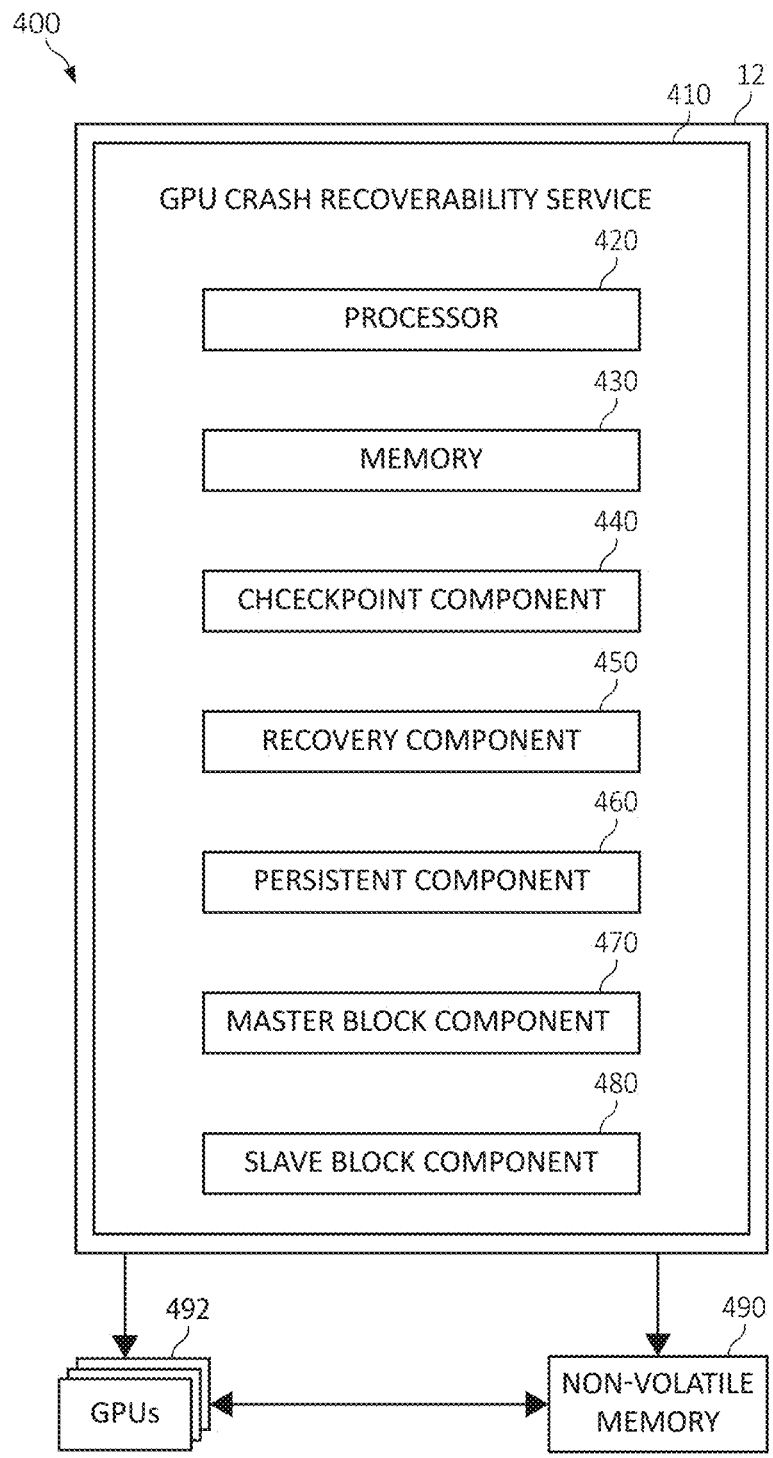
FIG. 4 illustrates a cloud computing network in which various aspects of the present invention may be realized.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. A GPU crash recoverability service 410 is shown, incorporating processing unit 420 ("processor") to perform various computational, data processing and other functionality in accordance with various aspects of the present invention. In one aspect, the processor 420 and memory 430 may be internal and/or external to the GPU crash recoverability service 410, and internal and/or external to the computing system/server 12. The GPU crash recoverability service 410 may be included in computer system/server 12, as described in FIG. 1.

In one aspect, the computer system/server 12 may be in communication with one or more GPUs such as, for example, GPUs 492 and non-volatile memory 490 (e.g., an SSD). In one aspect, the GPUs 492 may be included on the computer system/server 12 (e.g., internally located on and/or externally located to the computer system/server 12). Additionally, the non-volatile memory 490 may be included on the computer system/server 12 (e.g., internally located on and/or externally located to the computer system/server 12) and/or the non-volatile memory 490 may be externally located to the computer system/server 12.

The processing unit 420 may be in communication with the memory 430. The GPU crash recoverability service 410 may include a checkpoint component 440, a recovery component 450, a persistent component 460, a master block component 470, a slave component 480.

As one of ordinary skill in the art will appreciate, the depiction of the various functional units in GPU crash recoverability service 410 is for purposes of illustration, as the functional units may be located within the GPU crash recoverability service 410 or elsewhere within and/or between distributed computing components.

In one aspect, the checkpoint component 440 may checkpoint GPU application data and kernel execution state of one or more GPUs 492. The checkpoint component 440 may persist the checkpointed GPU application data and the kernel execution state on non-volatile memory 490. The recovery component 450 may recover the checkpointed GPU application data and the kernel execution state. The persistent component 460 may checkpoint the persisted to the non-volatile memory 490 (e.g., SSD) to provide crash consistency.

The checkpoint component 440 may synchronize the checkpointed GPU application data and the kernel execution state on each of the one or more GPUs 492. The checkpoint component 440 may track both executed GPU thread blocks, and unexecuted GPU thread blocks in a kernel of the one or more GPUs 492. The checkpoint component 440 may determine a status of the checkpointed GPU application data and the kernel execution state prior to executing a GPU thread block.

The checkpoint component 440 may represent a GPU kernel execution state by a bit vector in a GPU global memory such as, for example, memory 430 which may also be included in each of the one or more GPUs 492, where each bit represents an executed GPU thread block. Each of a plurality of executed GPU thread blocks may update a corresponding bit in the bit vector according to a block identifier (ID).

The master block component 470 may initiate a barrier by a master GPU thread block between one or more GPU slave thread blocks using a semaphore in the GPU global memory (e.g., memory 430). The master GPU thread block may be a first GPU thread block that identifies that a processor device intends to checkpoint. The slave block component 480 may enable one or more slave GPU thread blocks to reach the barrier.

The master block component 470 may signal one or more slave GPU thread blocks, by a master GPU thread block, to continue writing to a location in a GPU global memory (e.g., memory 430). The master block component 470 may signal an indication to a processor device 420 by the master GPU thread block that a checkpoint has been created in the processor device 420 (e.g., a CPU) and provide a pointer to the checkpointed GPU application data and the kernel execution state in the GPU global memory (e.g., memory 430 which may be included in each of the GPUs 492).

The GPU crash recovery service 410 may use one or more of the components (e.g., the checkpoint component 440, the recovery component 450, and/or the persistent component 460) to 1) read the checkpointed GPU application data and the kernel execution state upon initiation of an application, 2) initiate a direct memory access (DMA) by the processor device 420 between the non-volatile memory 490 and the one or more GPUs 492, and/or 3) execute a GPU thread block upon determining a bit vector in a GPU global memory (e.g., memory 430) corresponding to a block identifier (ID) of the GPU thread block is set/scheduled to perform execution.

To further illustrate the operations of the GPU crash recovery service 410, the checkpoint component 440 may track which GPU thread blocks associated with the one or more GPUs 492 in a kernel have executed and which have yet to execute. The checkpoint component 440 may use a bit-vector per kernel to represent which blocks have finished execution. When a checkpoint is created, registered application data and execution state (bit-vectors) may be checkpointed. The persistent component 460 may checkpoint the persisted to the non-volatile memory 490 (e.g., SSD) to provide crash recovery consistency.

In an additional aspect, for checkpointing, for each completed block, the checkpoint component 440 may update grid bit vectors. A CPU (e.g., processor unit 420) may signal the one or more GPUs 492 to initiate checkpoint creation. The first executing GPU block of the one or more GPUs 492 to receive the signal (e.g., a master GPU) initiates a barrier between all currently executing blocks. These thread blocks finish their regular execution before checkpoint is created by the checkpoint component 440. Newly scheduled blocks may wait to start their execution until after the checkpoint is created by the checkpoint component 440. The master block, which may use the master block component 470, copies state to a buffer of checkpoints in the GPU memory of one or more of the GPUs 492. The GPU execution continues. The processor 420 (e.g., CPU) initiates DMA between one or more GPUs 492 and the non-volatile memory 490 (e.g., SSD) to copy buffered checkpoint to log in the non-volatile memory 490 (e.g., SSD).

As mentioned, the recovery component 450 may recover the checkpointed GPU application data and the kernel execution state. After recovery and prior to a thread block executes, the checkpointed execution status may be determined/checked to see if the thread block has already executed. On application initiations, the log file is read using the recovery component 450 for the most recent/latest complete checkpoint. The processor 420 (e.g., a CPU) may initiate DMA between the non-volatile memory 490 (e.g., SSD) and one or more GPUs 492 to recreate data structures and grid bit vectors. Kernels may be launched similar to the original application. The block checks (via the recovery component 450, in association with one or more GPU threads) the bit in its grid's bit vector corresponding to its global block ID. By way of example only, if the bit is set as "1," the thread block has already executed, and the thread block does not need to perform any computation. If the bit is set as "0," the block executes.

In one aspect, the GPU crash recoverability service 410 may use multiple nodes with multiple GPUs such as, for example, GPUs 492 for GPU crash recoverability. Each CPU (e.g., processor 420) can synchronize and initiate a checkpoint on all GPUs such as, for example, GPUs 492. Each GPU checkpoints data and state to its own file on the non-volatile memory 490 (e.g., SSD). On recovery, the latest/most recently completed checkpoint on all GPUs 492 may be selected by the recovery component 450.

Figure 5:
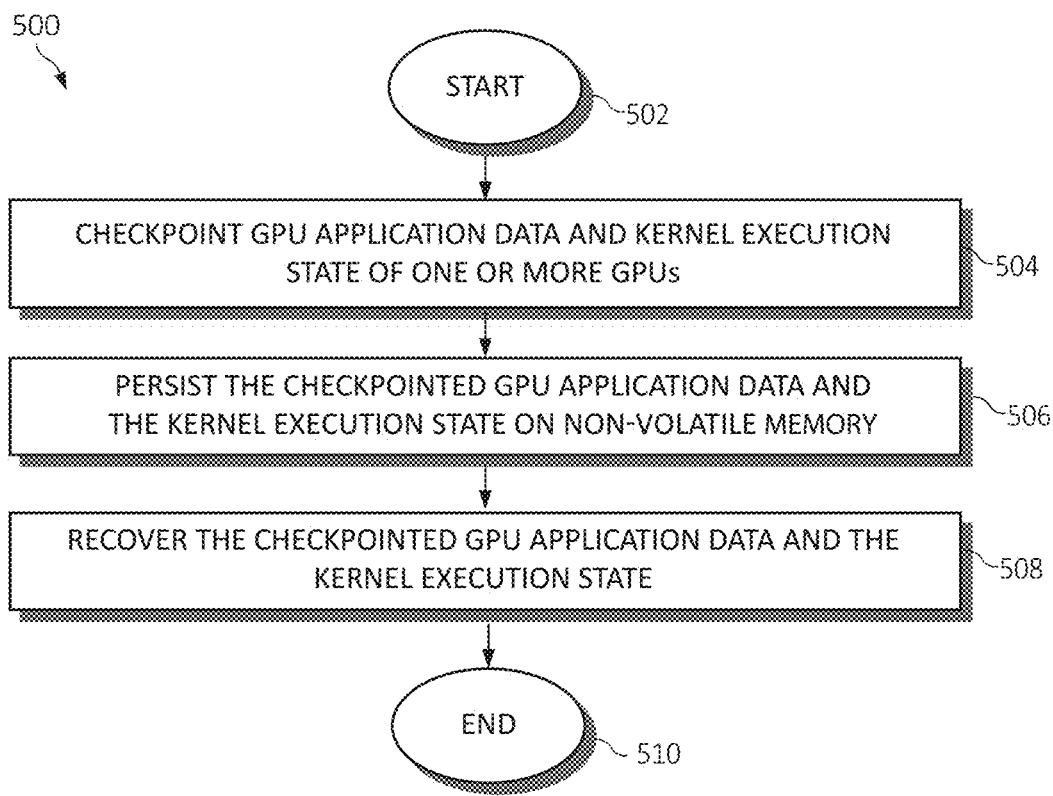
FIG. 5 is a flowchart diagram depicting an exemplary method for crash recoverability for graphics processing units (GPUs) in a computing environment in accordance with aspects of the present invention.

Turning now to FIG. 5, a method 500 for crash recoverability for graphics processing units (GPUs) in a computing environment is depicted. In one aspect, each of the devices, components, modules, operations, and/or functions described in FIGS. 1-4 also may apply or perform one or more operations or actions of FIG. 5. The functionality 500 may be implemented as a method executed as instructions on a machine, where the instructions are included on at least one computer readable medium or one non-transitory machine-readable storage medium. The functionality 500 may start in block 502.

GPU application data and kernel execution state of one or more GPUs may be checkpointed, as in block 504. The checkpointed GPU application data and the kernel execution state may be persisted on to non-volatile memory, as in block 506. The checkpointed GPU application data and the kernel execution state may be recovered, as in block 508. The functionality 500 may end, as in block 510.

Figure 6A:
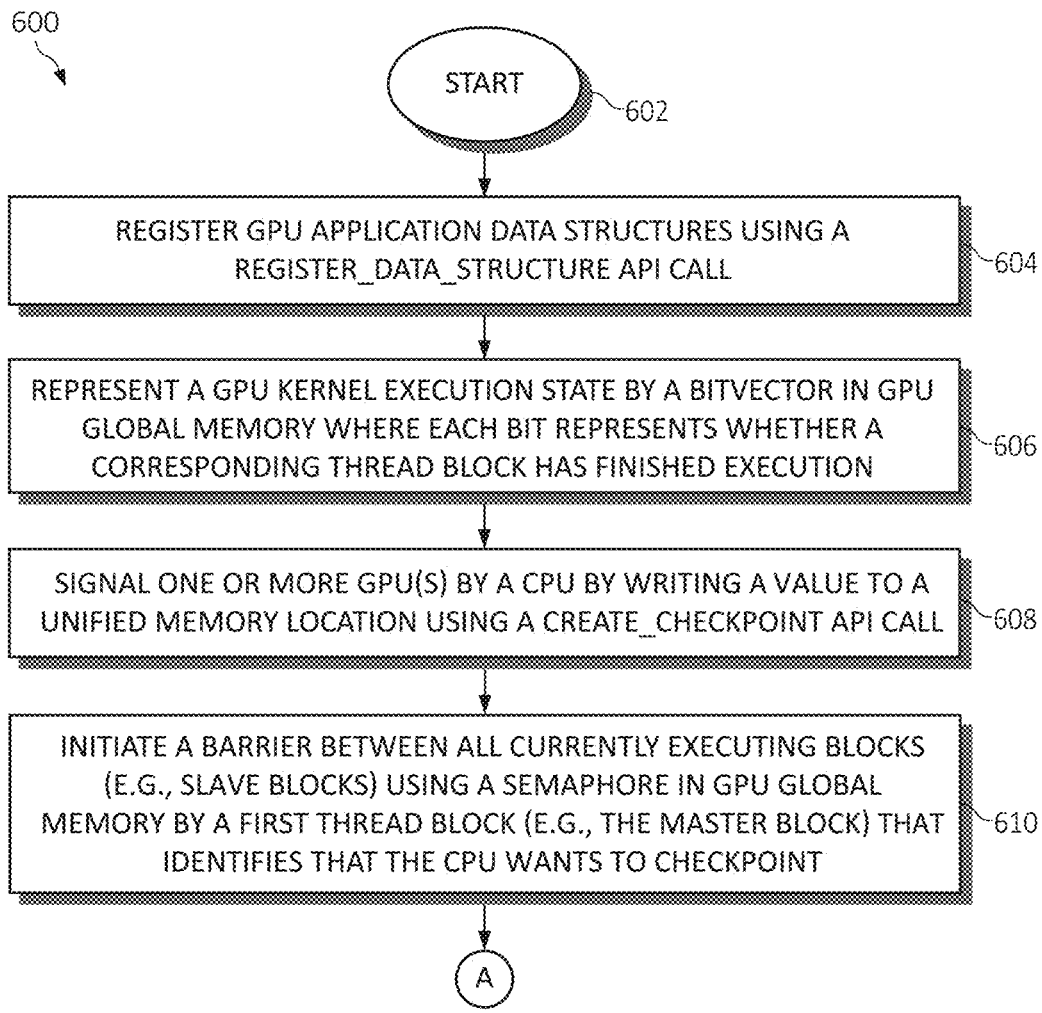
FIGS. 6A and 6B are a flowchart diagram depicting an exemplary method for checkpointing graphics processing units (GPUs) application data and kernel state execution state in which various aspects of the present invention may be realized.
Figure 6B:
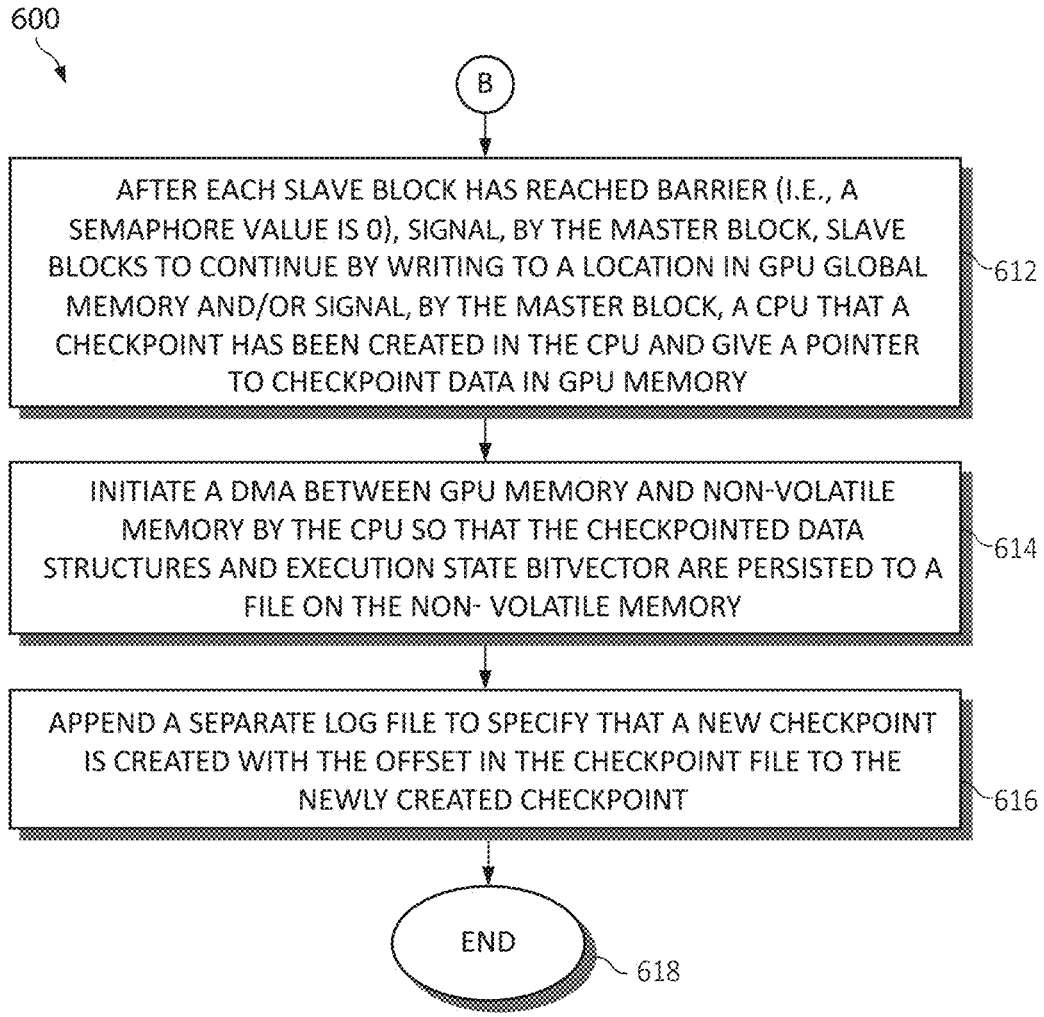

Turning now to FIGS. 6A-6B, a method 600 for checkpointing graphics processing units (GPUs) application data and kernel state execution state in a computing environment is depicted. In one aspect, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one computer readable medium or one non-transitory machine-readable storage medium. The functionality 600 may start in block 602.

GPU application data structures may be registered using an API call (e.g., a "register_data_structure" API call), as in block 604. A GPU kernel execution state may be represented by a bit vector in GPU global memory where each bit represents whether a corresponding thread block has finished execution, as in block 606. One or more GPU(s) may be signaled by a CPU by writing value to a unified memory location using a "create_checkpoint" API call, as in block 608. A barrier (e.g., local or distributed barrier depending on whether the GPU's are in a single computing node or distributed across multiple computing nodes) may be initiated between all currently executing blocks (e.g., slave blocks) using a semaphore in GPU global memory by a first thread block (e.g., the master block) that identifies that the CPU wants to checkpoint, as in block 610.

After each slave block has reached barrier (i.e., a semaphore value is 0), the master block signals slave blocks to continue by writing to a location in GPU global memory and/or the master block signals CPU that a checkpoint has been created in the CPU and giving a pointer to checkpoint data in GPU memory, as in block 612. Direct memory access ("DMA") may be initiated between the GPU memory and non-volatile memory (e.g., solid state drive "SDD") by the CPU so that the checkpointed data structures and execution state bit vector are persisted to a file on the non-volatile memory, as in block 614. A separate log file may be appended to specify that a new checkpoint is created with the offset in the checkpoint file to the newly created checkpoint, as in block 616. The functionality 600 may end, as in block 618.

Figure 7:
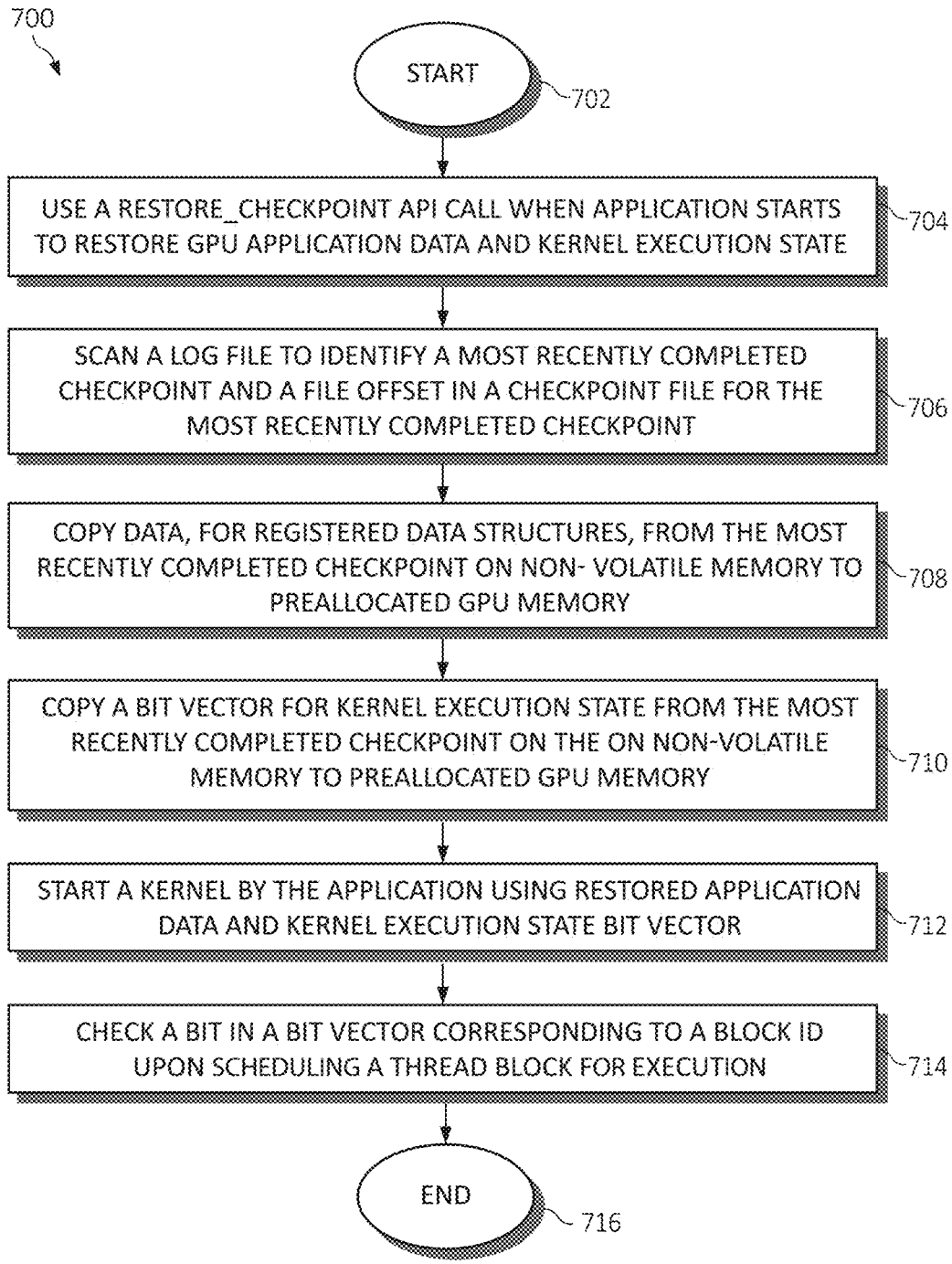
FIG. 7 is a flowchart diagram depicting an exemplary method for recovering checkpointed graphics processing units (GPUs) application data and kernel state execution state in which various aspects of the present invention may be realized.

Turning now to FIG. 7, a method 700 for recovering checkpointed graphics processing units (GPUs) application data and kernel state execution state in a computing environment is depicted. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

An API call (e.g., a "restore_checkpoint" API call) may be used when application starts to restore GPU application data and kernel execution state, as in block 704. A log file may be scanned to identify a most recently completed checkpoint and a file offset in a checkpoint file for the most recently completed checkpoint, as in block 706. Data, for registered data structures, may be copied from a most recently completed checkpoint on non-volatile memory to pre-allocated GPU memory, as in block 708. A bit vector may be copied for kernel execution state from the most recently completed checkpoint on the on non-volatile memory to pre-allocated GPU memory, as in block 710. A kernel may be started by the application using restored application data and kernel execution state bit vector, as in block 712. A bit may be identified/checked in a bit vector corresponding to a block ID upon scheduling a thread block for execution, as in block 714. The functionality 700 may end, as in block 716.

Figure 8:
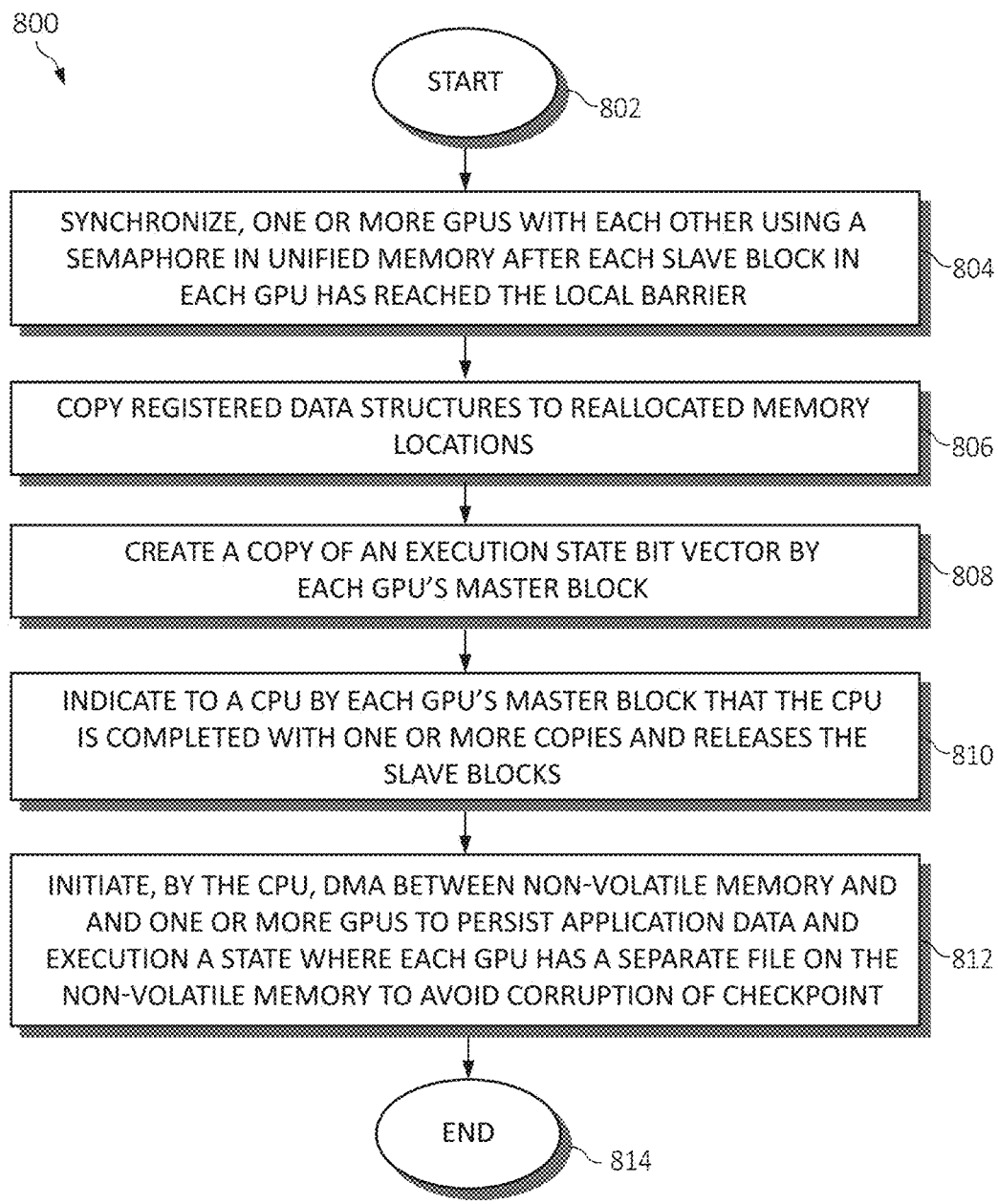
FIG. 8 is a flowchart diagram depicting an exemplary method for checkpointing with multiple graphics processing units (GPUs) in a computing environment, again in which various aspects of the present invention may be realized.

Turning now to FIG. 8, a method 800 for checkpointing with multiple graphics processing units (GPUs) in a computing environment is depicted. In one aspect, each of the devices, components, modules, operations, and/or functions described in FIGS. 1-7 also may apply or perform one or more operations or actions of FIG. 8. The functionality 800 may be implemented as a method executed as instructions on a machine, where the instructions are included on at least one computer readable medium or one non-transitory machine-readable storage medium. The functionality 800 may start in block 802.

One or more GPUs may be synchronized with each other using a semaphore in unified memory after each slave block in each GPU has reached the local barrier (or reached a distributed barrier if GPU's are distributed across multiple nodes), as in block 804. That is, if the GPUs are distributed across multiple nodes, after each slave block in each GPU has reached the local barrier, the CPUs managing the GPUs may synchronize with a distributed barrier. One or more registered data structures may be copied to reallocated memory locations, as in block 806. A copy of an execution state bit vector may be created/generated by each GPU's master block, as in block 808. Each GPU's master block may indicate/signal to a CPU that the CPU is completed with one or more copies and releases the slave blocks, as in block 810. The CPU may initiate direct memory access ("DMA") between non-volatile memory and one or more GPUs to persist application data and execution a state where each GPU has a separate file on the non-volatile memory to avoid corruption of checkpoint, as in block 812. The functionality 800 may end, as in block 814.

As before, if GPUs are associated with different host systems, then first said host systems may synchronize through a barrier operation at the CPU level before conducting the operation of the previous paragraph locally.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or host servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for crash recoverability for graphics processing units (GPUs) in a computing environment by a processor, comprising:

checkpointing GPU application data and kernel execution state of one or more GPUs;

recovering the checkpointed GPU application data and the kernel execution state;

persisting the checkpointed GPU application data and the kernel execution state on non-volatile memory; and executing a GPU thread block upon determining a bit vector in a GPU global memory corresponding to a block identifier (ID) of the GPU thread block that is set to perform execution.

2. The method of claim 1, further including synchronizing the checkpointed GPU application data and the kernel execution state on each of the one or more GPUs.

3. The method of claim 1, further including tracking both the executed GPU thread blocks and unexecuted GPU thread blocks in a kernel of the one or more GPUs.

4. The method of claim 1, further including determining a status of the checkpointed GPU application data and the kernel execution state prior to executing the GPU thread block.

5. The method of claim 4, further including:

representing a GPU kernel execution state by the bit vector in the GPU global memory where each bit represents the executed GPU thread block; wherein each of a plurality of executed GPU thread blocks updates a corresponding bit in the bit vector according to the block ID;

initiating a barrier by a master GPU thread block between one or more GPU slave thread blocks using a semaphore in the GPU global memory, wherein the master GPU thread block is a first GPU thread block that identifies that a processor device intends to checkpoint; and reaching the barrier by the one or more slave GPU thread blocks.

6. The method of claim 1, further including:

signaling one or more slave GPU thread blocks by a master GPU thread block to continue writing to a location in the GPU global memory; or signaling an indication to a processor device by the master GPU thread block that a checkpoint has been created in the processor device and providing a pointer to the checkpointed GPU application data and the kernel execution state in the GPU global memory.

7. The method of claim 1, further including:

reading the checkpointed GPU application data and the kernel execution state upon initiation of an application; and initiating a direct memory access (DMA) by a processor device between the non-volatile memory and the one or more GPUs.

8. A system for crash recoverability for graphics processing units (GPUs), comprising:

one or more computers with executable instructions that when executed cause the system to:

checkpoint GPU application data and kernel execution state of one or more GPUs;

recover the checkpointed GPU application data and the kernel execution state;

persist the checkpointed GPU application data and the kernel execution state on non-volatile memory; and execute a GPU thread block upon determining a bit vector in a GPU global memory corresponding to a block identifier (ID) of the GPU thread block that is set to perform execution.

9. The system of claim 8, wherein the executable instructions synchronize the checkpointed GPU application data and the kernel execution state on each of the one or more GPUs.

10. The system of claim 8, wherein the executable instructions track both the executed GPU thread blocks and unexecuted GPU thread blocks in a kernel of the one or more GPUs.

11. The system of claim 8, wherein the executable instructions determine a status of the checkpointed GPU application data and the kernel execution state prior to executing the GPU thread block.

12. The system of claim 8, wherein the executable instructions:

represent a GPU kernel execution state by the bit vector in the GPU global memory where each bit represents the executed GPU thread block; wherein each of a plurality of executed GPU thread blocks updates a corresponding bit in the bit vector according to the block ID;

initiate a barrier by a master GPU thread block between one or more GPU slave thread blocks using a semaphore in the GPU global memory, wherein the master GPU thread block is a first GPU thread block that identifies that a processor device intends to checkpoint; and reach the barrier by the one or more slave GPU thread blocks.

13. The system of claim 8, wherein the executable instructions:

signal one or more slave GPU thread blocks by a master GPU thread block to continue writing to a location in the GPU global memory; or signal an indication to a processor device by the master GPU thread block that a checkpoint has been created in the processor device and providing a pointer to the checkpointed GPU application data and the kernel execution state in the GPU global memory.

14. The system of claim 8, wherein the executable instructions:

read the checkpointed GPU application data and the kernel execution state upon initiation of an application; and initiate a direct memory access (DMA) by a processor device between the non-volatile memory and the one or more GPUs.

15. A computer program product for, by a processor, crash recoverability for graphics processing units (GPUs), the computer program product comprising a non-transitory computer-readable storage medium having computer-readable program code portions stored therein, the computer-readable program code portions comprising:

an executable portion that checkpoints GPU application data and kernel execution state of one or more GPUs;

an executable portion that recovers the checkpointed GPU application data and the kernel execution state;

an executable portion that persists the checkpointed GPU application data and the kernel execution state on non-volatile memory; and an executable portion that executes a GPU thread block upon determining a bit vector in a GPU global memory corresponding to a block identifier (ID) of the GPU thread block that is set to perform execution.

16. The computer program product of claim 15, further including an executable portion that synchronizes the checkpointed GPU application data and the kernel execution state on each of the one or more GPUs.

17. The computer program product of claim 15, further including an executable portion that tracks both the executed GPU thread blocks and unexecuted GPU thread blocks in a kernel of the one or more GPUs.

18. The computer program product of claim 15, further including an executable portion that determines a status of the checkpointed GPU application data and the kernel execution state prior to executing the GPU thread block.

19. The computer program product of claim 15, further including an executable portion that:
- represents a GPU kernel execution state by the bit vector in the GPU global memory where each bit represents the executed GPU thread block; wherein each of a plurality of executed GPU thread blocks updates a corresponding bit in the bit vector according to the block ID;
- initiates a barrier by a master GPU thread block between one or more GPU slave thread blocks using a semaphore in the GPU global memory, wherein the master GPU thread block is a first GPU thread block that identifies that a processor device intends to checkpoint;
- reaches the barrier by the one or more slave GPU thread blocks;
- signals the one or more slave GPU thread blocks by a master GPU thread block to continue writing to a location in the GPU global memory; or
- signal an indication to the processor device by the master GPU thread block that a checkpoint has been created in the processor device and providing a pointer to the checkpointed GPU application data and the kernel execution state in the GPU global memory.

20. The computer program product of claim 15, further including an executable portion that:
- reads the checkpointed GPU application data and the kernel execution state upon initiation of an application; and
- initiates a direct memory access (DMA) by a processor device between the non-volatile memory and the one or more GPUs.

\* \* \* \* \*